(12) United States Patent
Tezuka et al.

(10) Patent No.: US 10,632,944 B2
(45) Date of Patent: Apr. 28, 2020

(54) VEHICLE POWER SUPPLY SYSTEM CONTROL METHOD AND VEHICLE POWER SUPPLY SYSTEM

(71) Applicant: Nissan Motor Co., Ltd., Yokohama-shi, Kanagawa (JP)

(72) Inventors: Atsushi Tezuka, Kanagawa (JP); Tomoyuki Koike, Kanagawa (JP); Akifumi Koishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/333,632

(22) PCT Filed: Oct. 28, 2016

(86) PCT No.: PCT/JP2016/082013
§ 371 (c)(1),
(2) Date: Mar. 15, 2019

(87) PCT Pub. No.: WO2018/078785
PCT Pub. Date: May 3, 2018

(65) Prior Publication Data
US 2019/0256019 A1    Aug. 22, 2019

(51) Int. Cl.
*B60R 16/033* (2006.01)
*B60K 25/02* (2006.01)
(Continued)

(52) U.S. Cl.
CPC ......... *B60R 16/033* (2013.01); *B60K 25/02* (2013.01); *B60R 16/03* (2013.01); *B60R 16/037* (2013.01);
(Continued)

(58) Field of Classification Search
None
See application file for complete search history.

(56) References Cited

U.S. PATENT DOCUMENTS

| | | | |
|---|---|---|---|
| 2019/0107842 A1* | 4/2019 | Miura | G05D 1/0246 |
| 2019/0359221 A1* | 11/2019 | Ochida | B60R 16/02 |

FOREIGN PATENT DOCUMENTS

| | | |
|---|---|---|
| CN | 102811887 A | 12/2012 |
| CN | 103563205 A | 2/2014 |

(Continued)

*Primary Examiner* — Jared Fureman
*Assistant Examiner* — Aqeel H Bukhari
(74) *Attorney, Agent, or Firm* — Global IP Counselors, LLP

(57) ABSTRACT

A control method is performed to control first and second storage devices that are connected in parallel to an electric generator in which the second storage device has a lower internal resistance than that of the first storage device. In a case where a driver has requested automated driving during charging of the first storage device (e.g., a lead-acid battery) in a state in which a generator and the second storage device (e.g., a lithium-ion battery) are disconnected, the generator and the second storage device are electrically connected even when a charge ratio of the lead-acid battery is less than a prescribed percentage. In a case where the driver has not requested the automated driving, the generator and the second storage device are electrically connected after the charge ratio of the first storage device has reached the prescribed percentage.

6 Claims, 2 Drawing Sheets

(51) Int. Cl.
  *G05D 1/00* (2006.01)
  *H02J 7/14* (2006.01)
  *B60R 16/03* (2006.01)
  *B60W 30/14* (2006.01)
  *B60R 16/037* (2006.01)
  *H02J 7/00* (2006.01)
  *B60W 10/26* (2006.01)

(52) U.S. Cl.
  CPC ............ *B60W 10/26* (2013.01); *B60W 30/14* (2013.01); *G05D 1/0061* (2013.01); *H02J 7/00* (2013.01); *H02J 7/14* (2013.01); *H02J 7/1423* (2013.01); *B60Y 2300/91* (2013.01); *Y02T 10/7011* (2013.01); *Y02T 10/7016* (2013.01)

(56)  References Cited

FOREIGN PATENT DOCUMENTS

| | | |
|---|---|---|
| CN | 104052104 A | 9/2014 |
| CN | 104604085 A | 5/2015 |
| CN | 103563205 B | 1/2016 |
| CN | 105313694 A | 2/2016 |
| CN | 105765198 A | 7/2016 |
| DE | 10 2014 103 545 A1 | 9/2014 |
| DE | 10 2014 211 075 A1 | 12/2015 |
| EP | 2 960 096 A2 | 12/2015 |
| EP | 3 075 989 A1 | 10/2016 |
| JP | 2015-9791 A | 1/2015 |
| JP | 2015-204699 A | 11/2015 |
| JP | 2016-26949 A | 2/2016 |
| JP | 2016-128283 A | 7/2016 |
| WO | 2014/025069 A1 | 2/2014 |

\* cited by examiner

VEHICLE POWER SUPPLY SYSTEM CONTROL METHOD AND VEHICLE POWER SUPPLY SYSTEM

CROSS-REFERENCE TO RELATED APPLICATIONS

This application is a U.S. national stage application of International Application No. PCT/JP2016/082013, filed on Oct. 28, 2016.

BACKGROUND

Technical Field

The present invention relates to a method for controlling a power supply system for a vehicle, and a vehicle power supply system.

Background Information

Japanese Laid-Open Patent Application No. 2015-204699 (Patent Document 1) discloses a power supply system for a vehicle, the power supply system having a first storage device and a second storage device that has a lower internal resistance than does the first storage device.

SUMMARY

An object of the present invention is to provide a method for controlling a power supply system for a vehicle, and a power supply system for a vehicle, with which it is possible both to minimize a charging delay and to ensure electric power required for automated driving when a driver has requested automated driving during charging of a first storage device in a state in which an electric generator and a second storage device are disconnected.

A method for controlling a power supply system for a vehicle according to an embodiment of the present invention, wherein in a case where a driver has requested automated driving during charging of a first storage device in a state in which an electric generator and a second storage device are disconnected, the electric generator and the second storage device are electrically connected even when a charge ratio of the first storage device is less than a prescribed charge ratio, and in a case where the driver has not requested automated driving, the electric generator and the second storage device are electrically connected after the charge ratio of the first storage device has reached the prescribed charge ratio.

Thus, the present invention makes it possible both to minimize a charging delay and to ensure electric power required for automated driving.

DETAILED DESCRIPTION OF THE EMBODIMENTS

Embodiments of the present invention will be explained below with reference to the appended drawings.

First Embodiment

Figure 1:
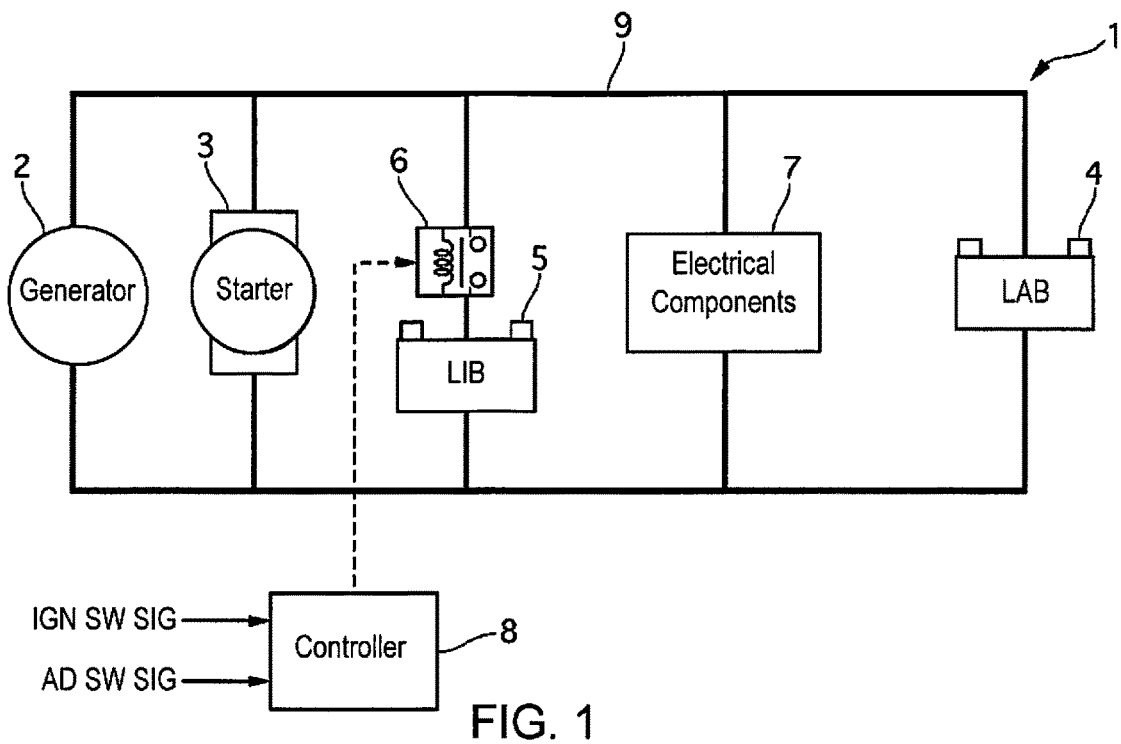
FIG. 1 is a block diagram of a power supply system for a vehicle in accordance with a first embodiment.

FIG. 1 is a block diagram of a power supply system 1 for a vehicle accordance with the first embodiment. The power supply system for a vehicle ("power supply system" below) 1 of the first embodiment is mounted in a vehicle that travels using an engine (internal combustion engine) as a drive source. The power supply system 1 has a generator (electric generator) 2, a starter 3, a lead-acid battery (first storage device) 4, a lithium-ion battery (second storage device) 5, a relay 6, electrical components 7, and a controller 8. The lead-acid battery 4, the lithium-ion battery 5, the starter 3, and the electrical components 7 are connected in parallel to the generator 2 via electrical supply cables 9. The electrical supply cables 9 together form an electrical supply channel for the electrical elements described above.

The generator 2 is an alternator having a voltage regulator, a rectifier, and an AC electric generator in which rotation of the engine is used as a drive source. The AC electric generator is directly connected to a crankshaft of the engine, or is indirectly connected thereto via a belt or a pulley. AC electric power generated by the AC electric generator is rectified into DC electric power by the rectifier and is stored in the lead-acid battery 4 and the lithium-ion battery 5. The voltage regulator maintains an output voltage of the generator 2 at a set designated generation voltage. The starter 3 meshes with the crankshaft of the engine via a gear mechanism during startup of the engine, applies external torque to the crankshaft, and starts up the engine.

The lead-acid battery 4 is a well-known general-purpose battery in which lead is used in electrodes. The lithium-ion battery 5 is a battery in which lithium ions are used in electrodes. The lithium-ion battery 5 has a lower internal resistance of components than does the lead-acid battery 4, and therefore has exceptional characteristics in terms of high-current charging (short charging time) and high-current discharging (high output). The lithium-ion battery 5 has a battery assembly in which a plurality of unit cells are connected in series. The relay 6 is connected in series to the lithium-ion battery 5 on a positive-terminal side of the lithium-ion battery 5. The relay 6 switches between connecting and disconnecting an electrical connection between the generator 2 and the lithium-ion battery 5. The relay 6 is a normally open mechanical relay that is off (open) when not energized and on (closed) when energized. The relay 6 is opened and closed by the controller 8.

The electrical components 7 constitute an electrical load (e.g., a windshield wiper motor, headlights, an air conditioner, an audio device, etc.) excluding the generator 2 and the starter 3. The electrical components 7 include an actuator and a controller that are used in automated driving and/or fuel consumption control. The automated driving includes partial automated driving, such as automatic braking to stop. Fuel consumption control includes control performed in an idling stop, a coasting stop to stop the engine during deceleration, a sailing stop to stop the engine during coasting, and a torque assist to drive the starter 3 during acceleration from a stationary condition.

The controller 8 controls opening and closing of the relay 6. The controller 8 generates a signal for opening and closing the relay 6 in accordance with an ignition switch signal, the state of charge (SOC; charge ratio, %; represents the ratio of quantity of charged electricity to electrical capacity) of the lead-acid battery 4, and an automated driving switch signal. The automated driving switch signal is on when an automated driving switch has been turned on by a driver, and is off when the automated driving switch has been turned off by the driver. Furthermore, the controller 8 enables or disables automated driving mode in accordance with the automated driving switch signal and a state of the relay 6. In the first embodiment, a configuration is adopted in which no transition can be made to the automated driving mode while automated driving is disabled by the controller 8.

Figure 2:
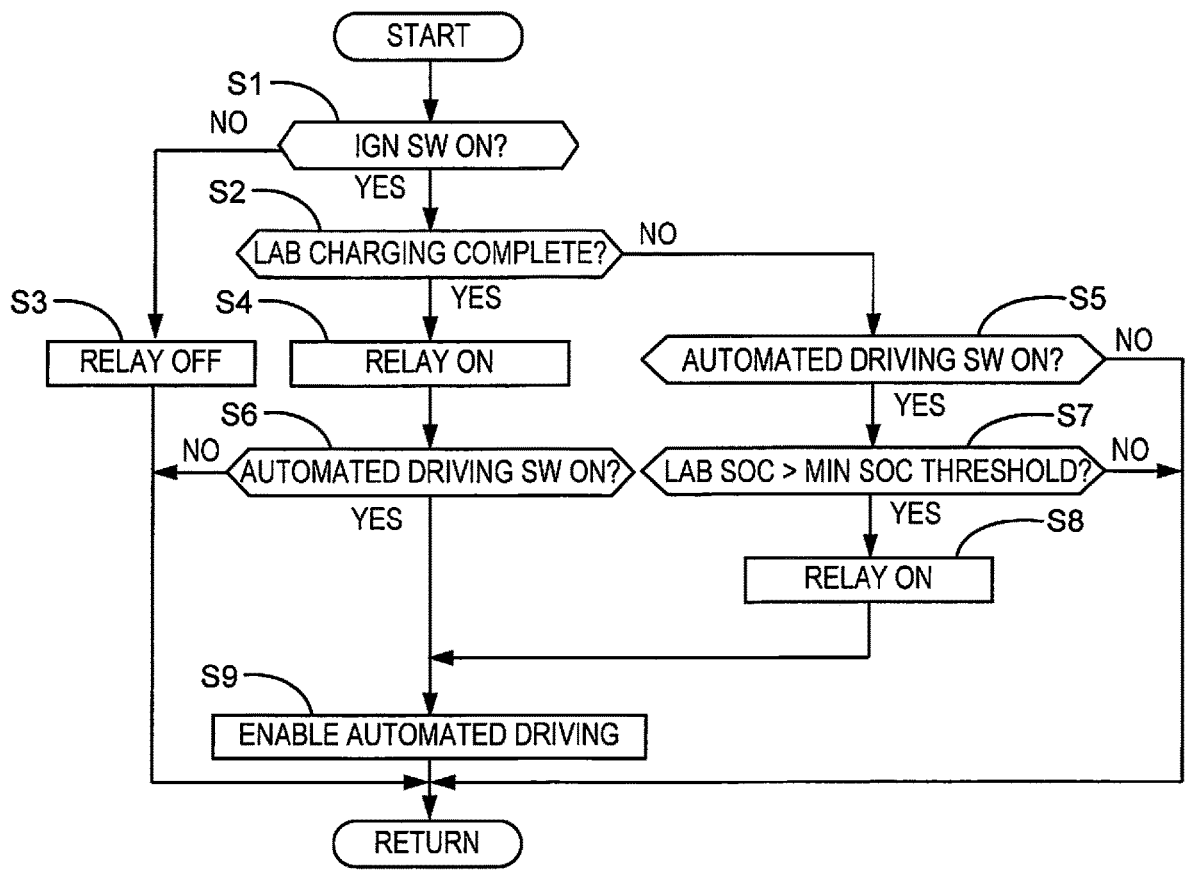
FIG. 2 is a flowchart showing a process flow performed by a controller in accordance with the first embodiment.

The controller 8 performs the control operation shown in FIG. 2 in order to minimize a delay in charging the lead-acid battery 4 and to ensure electric power required for automated driving when the driver has turned on the automated driving switch during charging of the lead-acid battery 4 after the ignition is turned on and the engine is initially started up. FIG. 2 is a flowchart showing a process flow performed by the controller 8. The controller 8 repeatedly executes these processes with a prescribed sampling period.

In step S1, it is determined whether an ignition switch signal is on. If YES, the process advances to step S2; if NO, the process advances to step S3.

In step S2, it is determined whether the SOC of the lead-acid battery 4 is at or above a prescribed percentage (e.g., 80%) that indicates charging is complete. If YES, the process advances to step S4; if NO, the process advances to step S5. Any method can be used to calculate the SOC. Examples include known charge integration methods and open voltage methods.

In step S3, the relay 6 is turned off (opened).

In step S4, the relay 6 is turned on (closed).

In step S5, it is determined whether the automated driving switch signal is on. If YES, the process advances to step S7; if NO, the process advances to RETURN.

In step S6, it is determined whether the automated driving switch signal is on. If YES, the process advances to step S9; if NO, the process advances to RETURN.

In step S7, it is determined whether the SOC of the lead-acid battery 4 is higher than a minimum SOC threshold. If YES, the process advances to step S8; if NO, the process advances to RETURN. The minimum SOC threshold is a value below the prescribed percentage that indicates charging is complete, and is set to a SOC (e.g., 50%) at which degradation of the lead-acid battery 4 will accelerate if the battery is used at or below this value.

In step S8, the relay 6 is turned on.

In step S9, automated driving is enabled.

The operations and effects of the first embodiment are described next. If the ignition is turned off in the flowchart shown in FIG. 2, the process flow advances from step S1 to S3, the relay 6 is turned off, and the lithium-ion battery 5 is cut off from the power supply system 1. Accordingly, only the lead-acid battery 4 supplies electric power to the electrical components 7 when the ignition is turned off.

If the automated driving switch is turned on after an ignition switch is turned on but before the lead-acid battery 4 is completely charged, the process flow advances in the order of steps S1, S2, S5, and S7 until the SOC of the lead-acid battery 4 exceeds the minimum SOC threshold, and only the lead-acid battery 4 is charged. If the SOC of the lead-acid battery 4 exceeds the minimum SOC threshold, the process flow advances in the order of steps S1, S2, S5, S7, S8, and S9, the relay 6 is turned on, the lithium-ion battery 5 is connected to the power supply system 1, and automated driving is enabled. If the automated driving switch is then turned off before the lead-acid battery 4 is completely charged, the process flow advances in the order of steps S1, S2, and S5, the lithium-ion battery 5 is cut off from the power supply system 1, and only the lead-acid battery 4 is charged.

Lithium-ion batteries have better charging and discharging performance than lead-acid batteries, and a power supply system for a vehicle in which the power supply system is provided with lithium-ion batteries in addition to conventional lead-acid batteries have become known in recent years for improving performance in terms of fuel consumption control. In a power supply system provided with these two storage devices, the lithium-ion battery is cut off from the system when the ignition is turned off, and electric power (dark current) is supplied to electrical components only by the lead-acid battery so as to prevent the lithium-ion battery from over-discharging while the vehicle is parked (while the ignition is turned off). Specifically, the SOC of a lead-acid battery decreases even while the ignition is turned off, and in order to start fuel consumption control earlier after the ignition is turned on and the engine is initially started up, it is preferable to charge only the lead-acid battery while the lithium-ion battery remains cut off from the system. If the lithium-ion battery is connected to a generator while the lead-acid battery is being charged, then most of the electric power generated will be used to charge the lithium-ion battery, which has a low internal resistance. Therefore, charging of the lead-acid battery will be delayed and it will be more difficult to start fuel consumption control earlier. In addition, the load on the generator becomes excessive due to the flow of a large current.

However, in a vehicle having an automated driving mode, electric power designed to keep the vehicle safe until a warning is issued to the driver and the driver regains control of the vehicle must be supplied even when an alternator (generator) fails. Because the driver cannot be expected to perform driving operations during this period, it is necessary to guarantee a larger quantity of electric power (maximum quantity of electric power that the lead-acid battery can supply) than is required during an alternator failure in a vehicle lacking an automated driving mode. Specifically, having the lithium-ion battery be connected to the system is an essential condition in order to start automated driving. Therefore, even if the driver turns on the automated driving switch during charging of the lead-acid battery, the lithium-ion battery will be cut off from the system, making it impossible for the vehicle to transition to automated driving mode and inconveniencing the driver.

By contrast, in the first embodiment, when the driver requests automated driving while the lead-acid battery 4 is being charged in a state in which the generator 2 and the lithium-ion battery 5 are disconnected, even when the charge ratio of the lead-acid battery 4 will be less than the prescribed percentage, and the generator 2 and the lithium-ion battery 5 will be electrically connected. When the driver does not request automated driving, the generator 2 and the lithium-ion battery 5 will be electrically connected after the charge ratio of the lead-acid battery 4 has reached the prescribed percentage. This makes it possible to prioritize charging of the lead-acid battery 4 and to minimize any delay in charging the lead-acid battery 4 when the driver has not requested automated driving. Accordingly, fuel consumption control can be started earlier. By contrast, when the driver has requested automated driving, connecting the lithium-ion battery 5 to the power supply system 1 even while the lead-acid battery 4 is being charged will make it possible to ensure electric power required for automated driving. Accordingly, automated driving can begin immediately and driver convenience can be enhanced.

Additionally, the generator 2 and the lithium-ion battery 5 are kept in a disconnected state in cases in which the SOC of the lead-acid battery 4 is less than the minimum SOC threshold when the driver requests automated driving. This makes it possible to minimize any dramatic reduction in a service life of the lead-acid battery 4.

In the first embodiment, the generator 2 and the lithium-ion battery 5 are disconnected when the ignition is turned off, and the lead-acid battery 4 is charged after the ignition is turned on and the engine is initially started up. This makes it possible to prevent the lithium-ion battery 5 from over-discharging while the vehicle is parked, and allows fuel consumption control to be started earlier.

The power supply system 1 in the first embodiment is provided with: a generator 2 driven by an engine; a lead-acid battery 4 and a lithium-ion battery 5 that has a lower internal resistance than does the lead-acid battery 4, the batteries being connected in parallel to the generator 2; a relay 6 that switches between connecting and disconnecting an electrical connection between the generator 2 and the lithium-ion battery 5; and a controller 8 that turns on the relay 6 at a charge ratio of the lead-acid battery 4 that is less than a prescribed percentage when the driver requests automated driving while the lead-acid battery 4 is being charged in a state in which the relay 6 is off, and turns on the relay 6 after the SOC of the lead-acid battery 4 has reached the prescribed percentage when the driver does not request automated driving. This makes it possible both to minimize any delay in charging the lead-acid battery 4 and to ensure electric power required for automated driving.

Second Embodiment

The basic configuration of the second embodiment is the same as that in the first embodiment, and therefore only the portion of the second embodiment differing from the first embodiment is described.

Figure 3:
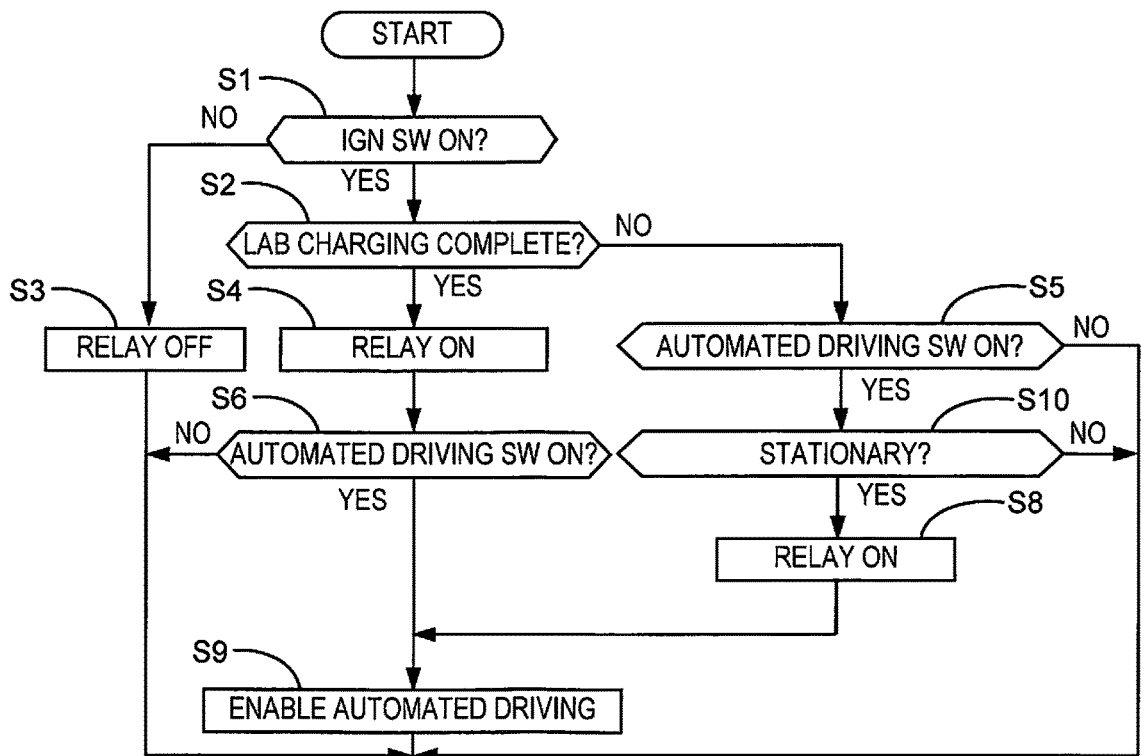
FIG. 3 is a flowchart showing a process flow performed by the controller in accordance with a second embodiment.

FIG. 3 is a flowchart showing a process flow performed by a controller 8 in the second embodiment.

In step S10, it is determined whether the vehicle is stationary (whether vehicle speed is approximately equal to zero). If YES, the process advances to RETURN; if NO, the process advances to step S8.

The operations and effects of the second embodiment are described next. In the flowchart shown in FIG. 3, it is determined in step S10 whether the vehicle is stationary when the automated driving switch is turned on while the lead-acid battery 4 is being charged. If it is determined in step S10 that the vehicle is stationary, the process flow advances in the order of steps S1, S2, and S5, and only the lead-acid battery 4 is charged. If it is determined in step S10 that the vehicle is traveling, the process flow advances in the order of steps S1, S2, S5, S 10, S8, and S9, the relay 6 is turned on, the lithium-ion battery 5 is connected to the power supply system 1, and automated driving is enabled.

In the second embodiment, the generator 2 and the lithium-ion battery 5 are kept in a disconnected state and automated driving is not enabled in a case where the vehicle is stationary when automated driving is requested. The power supply redundancy is unnecessary because only a small amount of electric power is required for automated driving in effect while the vehicle is stationary (e.g., for driving the vehicle from a stationary condition in automated mode). Additionally, even if the electric power required for automated driving is insufficient while the vehicle is stationary, this insufficiency will not immediately destabilize the vehicle. Accordingly, the generator 2 and the lithium-ion battery 5 are kept in a disconnected state in such instances, allowing the charging of the lead-acid battery 4 to be started earlier without destabilizing the behavior of the vehicle.

All other operations and effects are the same as in the first embodiment, and are therefore omitted from the description.

Third Embodiment

Figure 4:
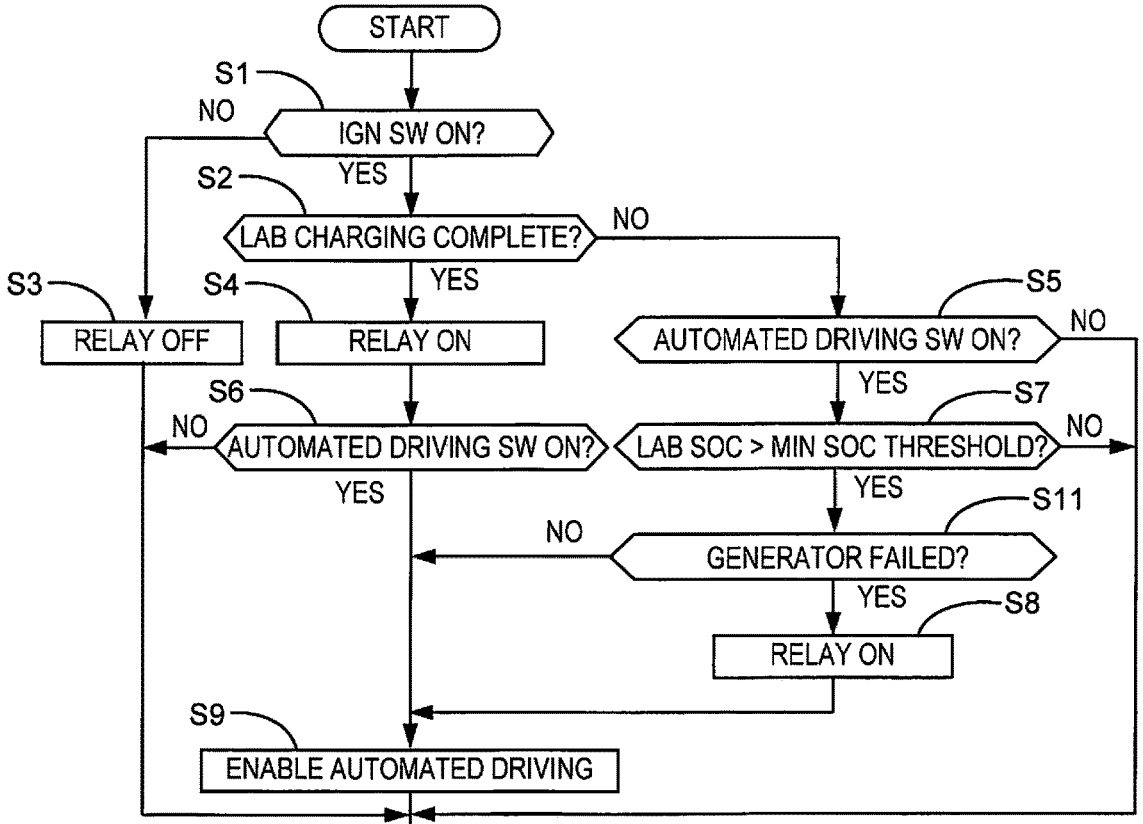
FIG. 4 is a flowchart showing a process flow performed by the controller in accordance with a third embodiment.

The basic configuration of the third embodiment is the same as that in the first embodiment, and only the portion of the third embodiment differing from the first embodiment is therefore described. FIG. 4 is a flowchart showing a process flow performed by a controller 8 in the third embodiment.

In step S11, it is determined whether the generator 2 has failed. If YES, the process advances to step S8; if NO, the process advances to step S9.

The operations and effects of the third embodiment are described next. In the flowchart shown in FIG. 4, it is determined in step S11 whether the generator 2 has failed when the automated driving switch is turned on during charging of the lead-acid battery 4 and the SOC of the lead-acid battery 4 exceeds the minimum SOC threshold. If it is determined in step S11 that the generator 2 has not failed, the process flow advances in the order of steps S1, S2, S5, S7, S11, and S9, and automated driving is enabled while the relay 6 remains turned off. If it is determined in step S11 that the generator 2 has failed, the process flow advances in the order of steps S1, S2, S5, S7, S11, S8, and S9, the relay 6 is turned on, the lithium-ion battery 5 is connected to the power supply system 1, and automated driving is enabled.

In the third embodiment, in a case where there is no failure of the generator 2 when automated driving is requested, automated driving is enabled in a state in which the generator 2 and the lithium-ion battery 5 are disconnected from each other. In a case where the generator 2 is operating normally, the electric power required for automated driving can be guaranteed by the generator 2 and the lead-acid battery 4 even if the lithium-ion battery 5 is not connected to the power supply system 1. Specifically, power supply redundancy is unnecessary when there is no failure of the generator 2. Accordingly, by keeping the generator 2 and the lithium-ion battery 5 disconnected in such cases, it is possible to charge the lead-acid battery 4 earlier while ensuring the electric power required for automated driving. By contrast, if the generator 2 fails when automated driving is requested, the generator 2 and the lithium-ion battery 5 are connected and automated driving is enabled. Because the electric power required for automated driving cannot be guaranteed if the generator 2 has failed, the lithium-ion battery 5 is connected to the power supply system 1 even when the lead-acid battery 4 is being charged, thereby making it possible to ensure the electric power required for automated driving.

All other operations and effects are the same as in the first embodiment, and are therefore omitted from the description.

Other Embodiments

While only selected embodiments have been chosen to illustrate the present invention, it will be apparent that the specific configuration of the present invention is not limited by these embodiments, and various design changes and modifications can be made herein without departing from the scope of the invention. For example, the first storage device and/or the second storage device can be a capacitor.

The invention claimed is:

1. A vehicle power supply system control method for controlling a vehicle power supply system comprising
   an electric generator driven by an internal combustion engine; and
   a first storage device and a second storage device connected in parallel to the electric generator, the second storage device having a lower internal resistance than that of the first storage device, the vehicle power supply system control method comprising
   electrically connecting the electric generator and the second storage device even when a charge ratio of the first storage device is less than a prescribed charge ratio when a driver has requested automated driving during charging of the first storage device in a state in which the electric generator and the second storage device are disconnected, and
   electrically connecting the electric generator and the second storage device after the charge ratio of the first storage device has reached the prescribed charge ratio when the driver has not requested the automated driving.

2. The vehicle power supply system control method according to claim 1, further comprising
   maintaining the electric generator and the second storage device in a disconnected state in a case where the charge ratio of the first storage device is less than a minimum threshold that is below the prescribed charge ratio when the automated driving is requested.

3. The vehicle power supply system control method according to claim 1, further comprising
   maintaining the electric generator and the second storage device in a disconnected state in a case where the vehicle is stationary when the automated driving is requested.

4. The vehicle power supply system control method according to claim 1, further comprising
   maintaining the electric generator and the second storage device in a disconnected state and the automated driving is enabled in a case where there is no failure of the electric generator when the automated driving is requested.

5. The vehicle power supply system control method according to claim 1, wherein
   the electric generator and the second storage device are disconnected when an ignition is turned off, and the first storage device is charged after the ignition is turned on and the internal combustion engine is initially started up.

6. A vehicle power supply system comprising:
   an electric generator driven by an internal combustion engine;
   a first storage device and a second storage device connected in parallel to the electric generator, the second storage device having a lower internal resistance than that of the first storage device;
   a relay that switches between connecting and disconnecting an electrical connection between the electric generator and the second storage device; and
   a controller configured to turn on the relay even at a charge ratio of the first storage device that is less than a prescribed charge ratio when a driver has requested automated driving while the first storage device is being charged in a state in which the relay is off, and turn on the relay after the charge ratio of the first storage device has reached the prescribed charge ratio when the driver has not requested the automated driving.

* * * * *